United States Patent Office 3,631,003
Patented Dec. 28, 1971

3,631,003
POLYAMIDES AND THEIR PRODUCTION
Isaac Goodman and Michael Edward Benet Jones, Runcorn, England, assignors to Imperial Chemical Industries Limited, London, England
No Drawing. Continuation of abandoned application Ser. No. 655,275, July 24, 1967. This application Feb. 24, 1970, Ser. No. 14,754
Claims priority, application Great Britain, Aug. 3, 1966, 34,802/66, 34,803/66, 34,804/66, 34,805/66, 34,806/66
Int. Cl. C08g 20/20
U.S. Cl. 260—78 R    12 Claims

ABSTRACT OF THE DISCLOSURE

Polyamides of specified minimum molecular weight having at least 50 mole percent of their repeating units, units derived from diaminodiphenyl sulphones and straight-chain α,ω-alkane dicarboxylic acids having at least 6 carbon atoms, including the carboxy carbon atoms, useful as structural polymers.

Also, a process for the preparation of such polyamides which comprises treating a diaminodiphenyl sulphone with the diacid halide of an α,ω-alkanedicarboxylic acid at or below room temperature in the presence of an organic solvent. The polyamides are useful in the manufacture of molded articles, films, fibers and the like.

---

This is a continuation of prior U.S. application Ser. No. 655,275, filed July 24, 1967, now abandoned.

This invention relates to polyamides, and more particularly to polyamides derived from aromatic diamines and aliphatic dicarboxylic acids.

It is known to react together diamines and dicarboxylic acids to give macromolecular polyamides. In general, such polyamides have been found to be either highly crystalline, high-melting materials which are difficult to fabricate, or amorphous materials having lower softening points, but whose properties fall off rapidly as the temperature increases.

We have now found that high molecular weight polyamides derived from diaminodiphenyl sulphones and certain α,ω-alkanedicarboxylic acids are amorphous or at most only weakly crystalline materials having softening points low enough for them to be shaped in conventional equipment for shaping thermoplastic materials and yet give tough, strong shaped articles which retain their properties to high temperatures. The remarkable properties of these high molecular weight materials could not have been predicted from examination of their low molecular weight homologues.

Thus according to the present invention we provide a polyamide having a reduced viscosity, as hereinafter defined, of at least 0.5 decilitre gm.$^{-1}$, measured on a 1.0 gm. decilitre$^{-1}$ solution in 98% by weight aqueous sulphuric acid at 25° C., and having as at least 50 mole percent, and preferably substantially all, of the repeating units in the macromolecular chain units of the structure I below:

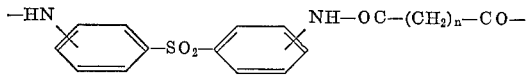

I wherein each —NH— group may be in the 2-, 3- or 4-position on the benzene ring, wherein the benzene hydrogen atoms may be replaced by substituent groups selected from alkyl groups having from 1 to 4 carbon atoms, alkoxy groups having from 1 to 4 carbon atoms, and halogen atoms, if desired, and wherein $n$ is a positive integer in excess of 3.

According to a further embodiment of the present invention we provide a process for the preparation of a polyamide which comprises treating one or more diaminodiphenyl sulphones having the structure II below:

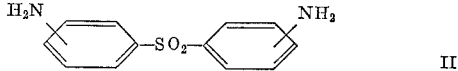

II wherein each amino group may be in the 2-, 3- or 4-position on the benzene ring, and wherein the benzene hydrogen atoms may be replaced by substituent groups selected from alkyl groups having from 1 to 4 carbon atoms, alkoxy groups having from 1 to 4 carbon atoms, and halogen atoms, if desired, or amide-forming derivatives thereof, in solution in an organic solvent, with substantially equimolar proportions of one or more diacid halides of α,ω-alkanedicarboxylic acids having the structure III below:

$$\text{HOOC—(CH}_2)_n\text{—COOH} \qquad \text{III}$$

wherein $n$ is a positive integer in excess of 3, the said organic solvent being a liquid under the conditions of the reaction, being a solvent for both diacid and diamine components and having a swelling or at least partial solvation action on the polymeric product under the conditions of the reaction.

The diaminodiphenyl sulphones having the structure II above which may be used in the preparation of our polyamides include, for example, 4,4'-diaminodiphenyl sulphone, 3,3'-diaminodiphenyl sulphone, 3,4'-diaminodiphenyl sulphone, 2,3'-diaminodiphenyl sulphone and 2,4'-diaminodiphenyl sulphone. It is generally preferred to use 3,3'-diaminodiphenyl sulphone and more preferably 4,4'-diaminodiphenyl sulphone on account of availability and cost.

Although it is preferred to use unsubstituted diaminodiphenyl sulphones in the preparation of our polyamides, if desired the benzene hydrogen atoms may be replaced by alkyl groups having from 1 to 4 carbon atoms, that is methyl, ethyl, n-propyl, iso-propyl, n-butyl, iso-butyl, or tert-butyl groups, alkoxy groups having from 1–4 carbon atoms, that is methoxy, ethoxy, n-propoxy, iso-propoxy, n-butoxy, iso-butoxy or tert-butoxy groups, or halogen atoms, especially chlorine and bromine atoms. It is preferred that not more than two hydrogen atoms be substituted on each benzene ring.

The diaminodiphenyl sulphones are preferably used as such, but amide-forming derivatives thereof, for example the hydrochlorides, may be used if desired. Mixtures of the diaminodiphenyl sulphones may be used if desired.

The α,ω-alkanedicarboxylic acids whose diacid halides may be used in the preparation of our polyamides include, for example adipic acid, pimelic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,15-pentadecanedicarboxylic acid, 1,16-hexadecanedicarboxylic acid, 1,18-octadecanedicarboxylic acid and 1,20-eicosanedicarboxylic acid.

It may be found that as the numbers of carbon atoms in the acids increase, the polyamides prepared therefrom tend to become less strong, have lower softening points, and to show higher degrees of crystallinity. It is therefore preferred to use those acids wherein $n$, in the structures I and III above, is not more than 14, and more preferably 4, 5, 6, 7, 8 or 10, on account of availability. Mixtures of such acids may be used if desired.

As organic solvents to be used in the process of our invention may be mentioned in particular the highly polar organic solvents. It is preferred to use those solvents in which the polymeric product remains in solution until a high molecular weight is achieved. Examples of suitable organic solvents include methyl ethyl ketone, acetonitrile, propionitrile, cyclic tetramethylene sulphone, 2,4- dimethyl cyclic tetramethylene sulphone, hexamethylphosphoramide, tetramethylurea, N,N - dialkylcarboxamides of aliphatic carboxylic acids containing at least two carbon atoms including the carboxy carbon atom, for example N,N-dimethylacetamide or N,N-dimethylpropionamide, and halogenated hydrocarbons containing at least two halogen atoms selected from chlorine and bromine, for example methylene chloride. It is preferred to use an N,N-dialkylcarboxamide, and more preferably N,N-dimethylacetamide as the organic solvent.

The reaction is preferably effected at a temperature at or below room temperature, to minimize discolouration and allow a high molecular weight product to be obtained. Temperatures in the range −20° C. to +25° C. are preferred. Higher or lower temperatures may be used if desired but it is unlikely that any material advantage is gained thereby.

The reaction is preferably effected in the presence of an acid acceptor. Such acid acceptors are well-known for polycondensation reactions and include, for example, tertiary amines, for example triethylamine and N,N-dialkylcarboxamides, and inorganic salts of weak acids and strong bases, for example sodium carbonate and ammonium carbonate. It is preferred that the acid acceptor be soluble in the organic solvent employed in the polymerisation process, but wher the acid acceptor is insoluble in that solvent, for example as in the case of sodium carbonate, it may be added to the reaction mixture as a solid suspension.

It has been found particularly useful to use an N,N-dialkylcarboxamide, preferably N,N-dimethylacetamide as both acid acceptor and solvent. N-methylpyrrolidone may also be used as both solvent and acid acceptor.

The reaction is preferably effected in the absence of oxygen to minimise discolouration of the product, and it has been found advantageous to effect the process under an atmosphere of an inert gas, for example nitrogen. The pressure at which the reaction is effected is not critical, and it has been found convenient to use atmospheric pressure.

In addition, it is preferred to stir the reaction mixture to ensure good mixing of the reactants.

In our preferred polymerisation procedure, the acid in the form of a diacid halide is added to a solution of the diamine, or amide-forming derivative thereof, in N,N-dimethylacetamide at a temperature below room temperature, under an atmosphere of nitrogen and with vigorous stirring. Polymerisation is rapid at that temperature and cooling is generally necessary to maintain the reaction temperature below room temperature. After stirring the reaction mixture for a short period of time, during which polymerisation may be detected by the increase in viscosity of the reaction mixture, the mixture is allowed to warm to about room temperature, the mixture then being stirred until the desired degree of conversion is achieved as determined, for example, by measuring the reduced viscosities of samples of the product, from 1 to 4 hours being generally found sufficient. The resultant polymer may be isolated by conventional means, for example by pouring the polymer solution into a non-solvent for the polymer, for example water.

Factors which affect the molecular weights, and hence reduced viscosities, of the products of our process include (i) the relative molar proportions of the diamine and diacid components, which should be as close as possible to 1:1 in order to achieve high molecular weights. (ii) the purity of the reactants, and the presence or absence of reactive monofunctional materials which may have an adverse effect on the molecular weight, and (iii) the choice of reaction conditions, for example temperature, which is preferably below room temperature, reaction time, and the ratio of reactants to solvent, lower concentrations of reactants tending to result in lower molecular weights.

The polyamides of our invention are, as far as all practical melt applications are concerned, amorphous materials. In some cases, the polymers, as prepared, may be found to be weakly crystalline, especially as the numbers of carbon atoms in the dicarboxylic acids increase and where the diamine amino groups are in the 4-position on the benzene rings, and also some crystallinity may be induced in the polymers by treatment with ketonic solvents. However, other methods of inducing crystallinity, for example annealing processes or treatment with other solvents have not been found to be successful, and, where it is found, any crystallinity may be eliminated, if desired, by melting the polymers, which do not recrystallize on cooling.

These polyamides, like those already known, may be found to have a tendency to take up water from their surroundings, such a tendency decreasing, as regards both rate and quantity of water take up, with increasing numbers of carbon atoms in the dicarboxylic acid component of the polymers. The uptake of water may have some effect on the properties of the polymers, for example lowering their softening points, reducing their strengths and, on the other hand, increasing their impact strengths. As in the case of known polyamides, however, such effect has been found tolerable.

The polyamides have been found to be particularly suitable for structural applications. They may be shaped, for example by extrusion, moulding or vacuum forming, in conventional equipment for shaping thermoplastic materials, or, alternatively, they may be dissolved in suitable solvents, for example N,N-dimethylformamide, N,N-dimethylacetamide, dimethylsulphoxide, N-methylpyrrolidone and hexamethylphosphoramide, and films, filaments and fibres, which are generally transparent, may be obtained from the solutions. Such films, filaments and fibres may be drawn if desired. Those of our polyamides which exhibit some degree of crystallinity tend to be less soluble in the above solvents than their amorphous equivalents. However, such polymers may be dissolved in, for example, a 5% solution of lithium chloride in N,N-dimethylformamide.

The shaped products produced by these processes are strong and tough, their properties being comparable with, and in many cases better than, those of conventional structural polymers known in the art, such properties being maintained to temperatures approaching the full Vicat softening points of the polymers, themselves surprisingly high. Such properties could not have been predicted from the study of low molecular weight homologues of these polyamides. For example, the temperature at which the Dynamic Modulus of the polymer derived from 4,4′-diaminodiphenyl sulphone with azelaoyl chloride (full Vicat softening point 187° C.) falls to $10^9$ dynes. cm.$^{-2}$, that is the temperature at which the polymer becomes rubber like, is about 184° C. By way of comparison, typical temperatures at which the Dynamic Moduli of other structural polymers known in the art fall to $10^9$ dynes. cm.$^{-2}$ are shown below:

| Polymer: | Temperature, ° C.[1] |
|---|---|
| Nylon 66 | ~150 |
| Polycarbonate resins | ~160 |
| Polyphenylene oxide | ~250 |
| Polysulphones | ~190 |
| "Kematal"[2] (acetal copolymer based on trioxane) | ~160 |
| ABS resins | ~95 |

[1] At which dynamic modulus falls to $10^9$ dynes. cm.$^{-2}$.
[2] Registered trademark.

For such structural applications, it is preferred that the polymer have a reduced viscosity, as hereinafter defined, in the range 0.8 to 2.0 decilitres gm.$^{-1}$, measured on a 1 gm. decilitre$^{-1}$ solution in 98% sulphuric acid at 25° C. At 0.8 decilitres gm.$^{-1}$ and above the polymers display their optimum mechanical properties, while above 2.0 decilitres gm.$^{-1}$, the melt viscosities of the polymers tend to be too high for many applications. Polymers of our structure having reduced viscosities below 0.5 decilitre gm.$^{-1}$ tend to be excessively weak and brittle and hence unsuitable for structural applications.

The polyamides of our invention are resistant to corrosive atmospheres both acid and alkaline and resist chemical and thermal degradation. They give transparent films and moulded articles which resist crazing on immersion in various organic solvents when under stress. These polymers also show useful dielectric properties. Thus, in the form of film, they may be used as decorative trim, slot liners in electrical motors, insulation in transformers, capacitors, cables and the like. They may also be moulded, for example, into corrosion-resistant pipe or into containers. Solutions of the polymers may be used as varnishes and adhesives and for coating wire, fabric and the like. Fibres formed from the polymers, for example by spinning from solution, may be woven into fabric, for example for making protective clothing or filters, or may be formed into woven electrical sheathing.

Our preferred polymers are those derived from 4,4'- or 3,3'-diaminodiphenyl sulphone and adipic, pimelic, suberic, azalaic, sebacic, and 1,10-decanedicarboxylic acids. 4,4'-diaminodiphenyl sulphone is particularly preferred as the diamine component where high softening points are required for the products.

We believe that there is no advantage in replacing the diamine or diacid residues of our polyamides by other diamine or diacid residues. However, we do not exclude the possibility of replacing the diamine residues of our polyamides by the residues of other diamines, for example meta-phenylene diamine or 4,4'-diaminodiphenyl ether, or replacing the diacid residues by the residues of other dicarboxylic acids, for example malonic acid, 2-methyl glutaric acid, 2-vinyl adipic acid or isophthalic acid, provided that at least 50 mole percent of the repeating units in the polyamide macromolecular chains have the structure I above.

The polymers of the present invention may be further modified by the inclusion in the polymerisation reaction mixture of small amounts of reactive monofunctional materials, for example aniline, diphenylamine and acetyl chloride, to act as molecular weight regulators, and/or small amounts of reactive trifunctional or higher polyfunctional materials, for example 4,4'-diaminodiphenylamine, 2,4,4'-triaminodiphenyl sulphone or 3,3'-diaminobenzidine, to act as chain branching and cross-linking agents.

The polyamides of the present invention may, if desired, have mixed therewith conventional additives such as, for example, heat and light stabilisers, lubricants, plasticisers, pigments, dyes, mould-release agents and fillers such as glass fibre, asbestos fibre, finely powdered metals or metal oxides, graphite, carbon black, ground glass and molybdenum disulphide, and may be blended with other polymeric materials, natural or synthetic.

The invention is now illustrated but in no way limited by the following examples in which all proportions are expressed as parts by weight unless otherwise stated.

By reduced viscosity, herein before and in the examples, we mean the value obtained for $$\frac{t - t_o}{t_o \cdot c}$$

where $t$ is the flow time of a "$c$" gms. decilitre$^{-1}$ solution of the polymer in a given solvent through a given viscometer and $t_o$ is the flow time of the same volume of pure solvent through the same viscometer under the same conditions.

EXAMPLE 1

7.449 parts of 4,4'-diaminodiphenyl sulphone were dissolved in 28.1 parts of pure, dry N,N-dimethylacetamide. The solution was stirred under an atmosphere of dry nitrogen and cooled to —20° C. 5.491 parts of freshly distilled adipoyl chloride were added over a period of 2 mins., the reaction mixture being cooled to maintain the temperature below —10° C. When the addition was complete the reaction temperature was allowed to rise to room temperature (21° C.). Stirring was continued at this temperature for 2 hrs. after which time the viscous reaction mixture was diluted with 94.5 parts of N,N-dimethylformamide and the polymer produced was recovered as a precipitate by pouring the reaction mixture into 1,000 parts of vigorously stirred distilled water. The polymer was washed with a 2% solution of ammonia in a high speed mixer, and then three times with methanol, and was dried at 110° C. under a vacuum of 0.2 mm. Hg for 18 hrs.

9.8 parts of polymer were obtained having a reduced viscosity, measured on a 1 gm./100 cc. solution in 98% sulphuric acid at 25° C., of 0.71 decilitre gm.$^{-1}$.

Strong, transparent films were prepared by solvent casting from a suitable solvent (e.g. N,N-dimethylformamide) and by compression moulding at temperatures from about 230° C. to 300° C.

Samples of a 0.005″ (0.127 mm.) thick film, prepared by compression moulding the powdered polymer at 250° C. under a pressure of 2,500 p.s.i. (176 kg./cm.²) were examined in tensile tests at 21° C. at a strain rate of 500% min.$^{-1}$ giving the following result.

Yield stress: $1.32 \times 10^4$ p.s.i. (928 kg./cm.²)

These tensile tests, and those quoted in the following examples, were carried out on a Davenport Tensile Test machine using dumbell shaped samples die-stamped from the moulded films.

By way of comparison, typical yield stresses of several other polymeric materials, measured under similar conditions, are given below:

| Polymer: | Yield stress (p.s.i.) |
|---|---|
| ABS resins | $\sim 6 \times 10^3$ (422 kg./cm.²) |
| Nylon 6,6 (dry) | $1.1 \times 10^4$ (733 kg./cm.²) |
| Polyphenylene oxide | $1 \times 10^4$ (703 kg./cm.²) |
| Polycarbonate resins | $9 \times 10^3$ (633 kg./cm.²) |

Thus the polymer showed a strength greater than that of the ABS resins and at least comparable with, if not greater than, those of nylon 6,6, polycarbonate and polyphenylene oxide.

A ⅛″ (3.175 mm.) thick compression moulded plaque was examined in a Vicat softening point test, the following results being obtained:

| | ° C. |
|---|---|
| ⅒ Vicat Softening Point | 185 |
| Full Vicat Softening Point | 194 |

By way of comparison, typical Full Vicat Softening Points of a number of other polymeric materials are given below:

| Polymer: | Full Vicat Softening Point, ° C. |
|---|---|
| "Kematal"[1] acetal copolymer based on trioxane) | 162 |
| Polycarbonate resins | 151 |
| Polyphenylene oxide | 190 |
| Polysulphones | 185 |

[1] Registered trademark.

The density of the moulded polymer was found to be 1.321 gms./cc. at 22° C.

By way of comparison, typical densities of a number of other polymeric materials are given below:

| Polymer: | Density (gms./cc.) |
|---|---|
| ABS resins | 1.02–1.07 |
| Polycarbonate resins | 1.20–1.42 |
| Polysulphones | 1.24–1.25 |
| Polyphenylene oxide | 1.06 |
| Nylon 6,6 | 1.13–1.15 |
| Nylon 6 | 1.14 |

X-ray examination of the powdered polymer showed no evidence of crystallinity, and drawing strips of moulded film at from 170° C. to 200° C. followed by annealing under tension from 220° C. failed to induce any crystallinity.

EXAMPLE 2

A similar procedure to that described in Example 1 employing 69.52 parts of 4,4'-diaminodiphenyl sulphone and 51.25 parts of adipoyl chloride in 254 parts of N,N-dimethyl acetamide yielded 88.2 parts of polymer having a reduced viscosity, measured on a 1 gm./100 cc. solution in 98% sulphuric acid at 25° C., of 0.64 decilitre gm.$^{-1}$.

The polymer was extruded at 280° C., and at a shear rate of 1,000 sec.$^{-1}$ its melt viscosity was measured as $1.5 \times 10^4$ poise, showing it to be fabricatable on conventional equipment at around this temperature.

Plaques measuring 1" x 1" x ⅛" (25.4 x 25.4 x 3.175 mm.) were prepared by compression moulding at 260° C. at a pressure of 2,500 p.s.i. (176 kg./cm.$^2$) and these were used to determine the increase in weight by the uptake of water under various conditions. The following results were obtained:

| Conditions: | Increase in Weight (percent) |
|---|---|
| 400 hours immersion in water at 20° C. | 3.52 |
| 400 hours exposure to the atmosphere at ambient temperatures | 0.94 |

By way of comparison, typical increases in weight by the uptake of water on 400 hours exposure to the atmosphere at ambient temperatures are given below for a variety of polymeric materials:

| Polymer | Increase in (weight (percent) |
|---|---|
| Polycarbonate resins | 0.36 |
| Polyphenylene oxide | 0.1 |
| Nylon 6,6 | 1.5 |
| ABS resins | <<1 |
| Polysulphones | 0.2 |

EXAMPLE 3

4.96 parts of 4,4'-diaminodiphenyl sulphone were dissolved in 25 parts of pure, dry cyclic tetramethylene sulphone, and 7.0 parts of N,N-dimethylacetamide were added as an acid acceptor. The solution was stirred and cooled to −10° C. 3.66 parts of adipoyl chloride were then added and the reaction mixture was maintained at −10° C. with stirring for a further 30 mins. The reaction mixture was then allowed to warm to 22° C. and maintained at this temperature for 4 hours. The resulting viscous solution was diluted with 125 parts of N,N-dimethylformamide before isolating and purifying the polymer by similar techniques to those described in Example 1. After drying at 110° C. under vacuum for 18 hours, 6.5 parts of polymer were produced, having a reduced viscosity, measured on a 1 gm./100 cc. solution in 98% sulphuric acid at 25° C., of 0.89 decilitre gm.$^{-1}$.

Strong, transparent films were produced from the polymer by solvent casting, and by compression moulding.

EXAMPLE 4

Example 3 was repeated using 33 parts of pure dry hexamethylphosphoramide as the solvent, and without the addition of N,N-dimethylacetamide.

6.3 parts of a polymer having a reduced viscosity, measured on a 1 gm./100 cc. solution in 98% sulphuric acid at 25° C., of 0.63 decilitre gm.$^{-1}$, were obtained.

EXAMPLE 5

12.41 parts of 4,4'-diaminodiphenyl sulphone were dissolved in 75 parts of N,N-dimethylacetamide and the solution was reacted with 9.85 parts of pimeloyl chloride under similar conditions to those described in Example 1.

On drying, 15.6 parts of a polymer were obtained having a reduced viscosity, measured on a 1 gm./100 cc. solution in 98% sulphuric acid at 25° C., of 0.94 decilitre gm.$^{-1}$.

0.005" (0.127 mm.) thick transparent, strong, tough films were prepared by compression moulding the powdered polymer at 250° C. under a pressure of 2,500 p.s.i. (176 kg./cm.$^2$). The films had a degree of toughness (defined as the number of times the film could be folded through 180° and then back through 360° before fracture) of 9 to 12. By way of comparison, the degrees of toughness of 0.005" (0.127 mm.) thick films of certain other polymeric materials were measured, giving the following results:

| Polymer: | Degree of toughness |
|---|---|
| Polycarbonate resins | 8–10 |
| Polyphenylene oxide | 10–14 |
| Polysulphone | 6–9 |

Thus the polymer had a toughness greater than those of polycarbonate resins and polysulphones and approaching that of polyphenylene oxide.

Both the powdered polymers and the moulded film therefrom were completely amorphous on X-ray examination. However, a strip of the compression moulded film, when immersed in boiling acetone for 3 hours, became opaque and brittle, and X-ray examination showed that this treatment had induced a low degree of crystallinity in the polymer. Differential thermal analysis showed a Tg at 163° C. and a Tm at 217° C.

EXAMPLE 6

14.89 parts of 4,4'-diaminodiphenyl sulphone were dissolved in 80 parts of hexamethylphosphoramide and the stirred solution cooled to −10° C. under an atmosphere of nitrogen. 11.82 parts of pimeloyl chloride were added, the reaction mixture being cooled to maintain the temperature below −5° C. When the addition was complete the reaction mixture was allowed to warm to 21° C. and stirred for a further 1 hour. The viscous reaction mixture was diluted with N,N-dimethylformamide and the polymer was isolated, purified and dried as described in Example 1. 21 parts of polymer were obtained, having a reduced viscosity, measured on a 1 gm./100 cc. solution in 98% sulphuric acid at 25° C., of 1.06 decilitres gm.$^{-1}$.

⅛" (3.175 mm.) thick plaques, prepared by compression moulding at 250° C. and at 2,500 p.s.i. (176 kg./cm.$^2$) pressure, had a pencil hardness of 3–4H, a 1/10 Vicat softening point of 183° C. and a full Vicat softening point of 192° C.

EXAMPLE 7

9.932 parts of 4,4'-diaminodiphenyl sulphone and 2.000 parts of 4,4'-diaminodiphenyl ether were dissolved in 75 parts of pure, dry N,N-dimethylacetamide and the mixture was cooled to −12° C. 9.850 parts of pimeloyl chloride were added to the stirred reaction mixture over a period of 3 minutes, and after completion of the addition, the mixture was retained at −12° C. for a further 5 minutes. At the end of this time the reaction mixture was allowed to warm to 20° C., and stirring was continued at this temperature for a further 1½ hours, after which the reaction mixture was diluted with 286 parts of N,N-dimethylformamide and the product isolated by precipitation on pouring the reaction mixture into 2,000 parts of vigorously stirred distilled water. The product was washed with water and dried at 90° C. under a vacuum of 0.3 mm. of Hg.

18.0 parts of a polymer, having a reduced viscosity of 0.73 decilitre gm.$^{-1}$, measured on a 1.0 gm. decilitre$^{-1}$ solution in 98% sulphuric acid at 25° C., were produced.

Strong, transparent film and mouldings were prepared from the polymer by compression moulding at 240° C. X-ray examination of the mouldings showed them to be amorphous, and annealing the mouldings from 190° C. failed to induce any crystallinity.

Differential Thermal Analysis showed a Tg for the polymer of 171° C., and tensile tests carried out at a strain rate of 100%/min. at 21° C. on 0.005" (0.127 mm.) thick samples of compression moulded film gave the following results:

Yield stress—780 kg./cm.$^2$
Break stress—650 kg./cm.$^2$
Elongation to break—19%

EXAMPLE 8

24.83 parts of 4,4'-diaminodiphenyl sulphone were dissolved in 94 parts of pure, dry N,N-dimethylacetamide. The solution was stirred under an atmosphere of nitrogen and cooled to −20° C. 21.2 parts of suberoyl chloride were added, further cooling being necessary to maintain the temperature below −10° C. The reaction mixture was then allowed to warm to 20° C. and stirred at this temperature for 2 hours. The viscous reaction mixture obtained was diluted with N,N-dimethylformamide and the product recovered by precipitation on pouring the reaction mixture into vigorously stirred distilled water. The polymer was washed in a high-speed mixer, first with a 2% aqueous solution of ammonia and then three times with methanol and dried at 120° C. under a vacuum of 1.0 mm. Hg for 24 hours.

36 parts of polymer were obtained having a reduced viscosity, measured on a 1 gm./100 cc. solution in 98% sulphuric acid at 25° C., of 0.87 decilitre gm.$^{-1}$.

0.005" (0.127 mm.) thick, strong, transparent films were prepared by compression moulding the powdered polymer at 230° C. under a pressure of 2,500 p.s.i. (176 kg./cm.$^2$). These films had a degree of toughness, as defined in Example 5, of 3–5.

The polymer powder and samples of moulded film which had been drawn 300% at 120° C. and then annealed from 180° C. were all amorphous on X-ray examination.

⅛" (3.175 mm.) thick compression moulded plaques showed a ¹⁄₁₀ Vicat softening point of 180° C. and a full Vicat softening point of 188° C.

EXAMPLE 9

84.42 parts of 4,4'-diaminodiphenyl sulphone were dissolved in 318 parts of pure, dry N-N-dimethylacetamide, and the solution cooled to −20° C. under an atmosphere of dry nitrogen. 71.80 parts of suboroyl chloride were added to the stirred mixture over a period of 30 secs., and stirring was continued at this temperature for 5 minutes before allowing the reaction mixture to warm to room temperature. After further stirring, at room temperature, for 1½ hours, the solution was diluted with 954 parts of N,N-dimethylformamide and the polymer isolated by precipitation from 10,000 parts of vigorously stirred distilled water and filtration. The product was washed repeatedly with distilled water in a high speed mixer and dried at 120° C. under a vacuum of 0.2 mm. of Hg.

128 parts of polymer were produced, having a reduced viscosity, meausred on a 1.0 gm. decilitre$^{-1}$ solution in 98% sulphuric acid at 25° C., of 0.80 decilitre gm.$^{-1}$. Strong, tough, transparent plaques and film were prepared from the polymer by compression moulding at 250° C.

Tensile tests carried out at a strain rate of 10%/min. at 21° C. on samples die-stamped from 0.005" (0.127 mm.) thick compression moulded film gave the following results:

Yield stress—640 kg./cm.$^2$
Break stress—580 kg./cm.$^2$
Elongation to break—25%

A 2" x 2" x ⅛" (50.8 x 50.8 x 3.175 mm.) plaque was immersed in distilled water at 20° C. for 400 hours. At the end of this time the increase in weight of the plaque due to water uptake was measured, and found to be 2.0%.

A further preparation of this polymer yielded a product which was insoluble in cold N,N-dimethylformamide, and for with Differential Thermal Analysis showed a melting point of 216° C. X-ray examination of this polymer showed it to be weakly crystalline. However, transparent films, compression moulded from the polymer, were amorphous on X-ray examination, and annealing at 190° C. for 1 hour induced no crystallinity in the films.

EXAMPLE 10

12.41 parts of 4,4'-diaminodiphenyl sulphone were dissolved in 87.5 parts of N,N-dimethylacetamide and reacted, under the conditions described in Example 1, with 11.25 parts of azelaoyl chloride, to yield 19.2 parts of a polymer having a reduced viscosity, measured on a 1 gm./100 cc. solution in 98% sulphuric acid at 25° C., of 1.20 decilitres gm.$^{-1}$.

0.005" (0.127 mm.) thick films, compression moulded from the polymer at 230° C. and at 2,500 p.s.i. (176 kg./cm.$^2$) pressure, were transparent, strong and tough, having a degree of toughness, as defined in Example 5, of 7 to 9.

Plaques, compression moulded from the polymer, had a ¹⁄₁₀ vicat softening point of 178° C., and a full Vicat softening point of 187° C. The density was measured as 1.258 gms./cc. at 22° C.

X-ray examination of the powdered polymer, and of moulded and drawn/annealed films thereof, showed no evidence of crystallinity.

Tensile tests carried out at a strain rate of 100%/min. on samples of 0.005" (0.127 mm.) thick film, compression moulded from the polymer, gave the following results at 23° C.

Yield stress—680 kg./cm.$^2$
Break stress—620 kg./cm.$^2$
Elongation to break—50%

A 2" x 2" x ⅛" (50.8 x 50.8 x 3.175 mm.) compression moulded plaque was immersed in distilled water at 23° C. for 400 hours, and was found to have increased in weight by 2.0% at the end of that period. A similar sample immersed in boiling water for 24 hours showed a weight increase of 4.8%.

EXAMPLE 11

251 parts of polymer of reduced viscosity 1.1 decilitres gm.$^{-1}$ (measured on a 1 gm./100 cc. solution in 98% sulphuric acid at 25° C.) were obtained by reacting 190 parts of azelaoyl chloride with a solution of 212 parts of 4,4'-diaminodiphenyl sulphone in 1,510 parts of N,N-dimethylacetamide under similar reaction conditions to those described in Example 10.

A series of experiments were carried out on the product using a micro-rheometer to determine its melt viscosity at various temperatures in the range 230 to 280° C., the results being summarized in Table I below:

TABLE I

| Temp., ° C. | Shear stress; dynes/cm.$^2$ | Viscosity; poise |
|---|---|---|
| 230 | 1.1×10$^6$<br>3.9×10$^5$ | 7.38×10$^4$<br>1.4×10$^5$ |
| 240 | 3.9×10$^5$<br>8.2×10$^5$ | 1.27×10$^4$<br>8.2×10$^3$ |
| 250 | 1.5×10$^5$<br>3.9×10$^5$ | 6.0×10$^3$<br>3.9×10$^3$ |
| 260 | 9.2×10$^5$<br>1.6×10$^5$ | 1.8×10$^3$<br>1.6×10$^3$ |
| 270 | 6.4×10$^4$<br>1.3×10$^5$ | 1.1×10$^3$<br>1.5×10$^2$ |
| 280 | 5.6×10$^4$<br>7.6×10$^4$ | 2.1×10$^3$<br>7.9×10$^2$ |

This showed one polymer to be sufficiently fluid to be injection moulded on conventional equipment at temperatures of 260° C. and above, such temperatures being readily attainable on conventional equipment. By way of comparison, typical injection moulding temperatures of a variety of other polymeric materials are given below:

| Polymer | Injection moulding temperature, °C. |
|---|---|
| Polysulphone | 340–400 |
| Polycarbonate resins | 270–320 |
| Polyphenylene oxide | 320–360 |
| Nylon 6,6 | 270–320 |
| ABS resins | 200–260 |

EXAMPLE 12

A sample of polymer, prepared by the reaction of 4,4'-diaminodiphenyl sulphone and azelaoyl chloride in N,N-dimethylacetamide solution, and having a reduced viscosity, measured on a 1 gm. decilitre$^{-1}$ solution of the polymer in 98% sulphuric acid at 25° C., of 1.05 decilitres gm.$^{-1}$, was compression moulded at 240° C. to provide 0.005" (0.127 mm. thick films. Tensile tests carried out at a strain rate of 100%/min. on dumbbell shaped samples of these films at 100° C. gave the following results:

Yield stress—680 kg./cm.$^2$
Break stress—620 kg./cm.$^2$
Elongation to break—60%

EXAMPLE 13

248.3 parts of 4,4'-diaminodiphenyl sulphone in 1,500 parts of N,N-dimethylacetamide were treated with 225 parts of azelaoyl chloride under the conditions of Example 9 to give 381 parts of a polymer having a reduced viscosity of 0.84 decilitre gm.$^{-1}$, measured on a 1 gm. decilitre$^{-1}$ solution in 98% sulphuric acid at 25° C.

The product was only partially soluble in N,N-dimethylformamide and X-ray examination showed it to be weakly crystalline. Differential Thermal Analysis showed a melting point at 211° C., but no recrystallisation peak was observed on cooling.

Samples of film, compression moulded from the polymer at 240° C., were completely amorphous, and annealing at 190° C. for up to 3 hours induced no crystallinity in the film.

As an indication of the oxidative/thermal stability of the polymer, samples of the film were heated at 150° C. in a circulating-air oven. Samples were removed at intervals and the reduced viscosities of 1 gm. decilitre$^{-1}$ solution in 98% sulphuric acid at 25° C. determined. The results are tabulated below:

| Exposure time, hours | Temperature, °C. | Reduced viscosity of sample decilitre, gm.$^{-1}$ |
|---|---|---|
| 0 | 23 | 0.84 |
| 24 | 149 | 0.88 |
| 48 | 150 | 0.84 |
| 72 | 150 | 0.86 |
| 96 | 150 | 0.82 |
| 168 | 150 | 0.84 |

Thus no loss in reduced viscosity was experienced under these conditions, showing the polymer to be resistant to both oxidation and thermal degradation at this temperature.

EXAMPLE 14

A polymer of reduced viscosity 0.94, measured on a 1 gm. decilitre$^{-1}$ solution in 98% sulphuric acid at 25° C., was prepared from 4,4'-diaminodiphenyl sulphone and azelaoyl chloride by the method of Example 10. The polymer was spun to a fibre by extrusion through a single-hole spinneret at a temperature of 280° C., the fibre being wound up at a rate of 200 ft./min. The resultant amorphous fibre was drawn 150% by drawing over a heated shoe at 150° C. The drawn fibres had a tenacity of 2 gms. per denier and an extension to break of 150%, measured on an Instron Tensometer at a strain rate of 50%/min. at 21° C.

EXAMPLE 15

4.966 parts of 3,3'-diaminodiphenyl sulphone were dissolved in 35.6 parts of pure, dry N,N-dimethylacetamide and treated with 4.503 parts of azelaoyl chloride under the conditions described in Example 10.

7.9 parts of a polymer having a reduced viscosity of 0.73 decilitre gm.$^{-1}$, measured on a 1 gm. decilitre$^{-1}$ solution in 98% sulphuric acid at 25° C., were produced.

The product was amorphous, from X-ray examination, and no crystallinity was detected in thin films prepared from the polymer by compression moulding at 230° C. Annealing these films from 180° C. at 2° C./min. did not induce crystallinity.

Differential Thermal Analysis showed a Tg at 127° C., and a Vicat softening point test carried out on a 1⁄16" thick compression moulded plaque showed the polymer to have a 1⁄10 Vicat softening point of 140° C., and a full Vicat softening point of 143° C.

EXAMPLE 16

5.522 parts of 4,4'-dimethyl-3,3'-diaminodiphenyl sulphone, dissolved in 37.5 parts of pure, dry N,N-dimethylacetamide were treated with 4.503 parts of azelaoyl chloride following the procedure described in Example 7. 8.6 parts of polymer were produced, having a reduced viscosity of 0.78 decilitre gm.$^{-1}$, measured on a 1.0 gm. decilitre$^{-1}$ solution in 98% sulphuric acid at 25° C.

Transparent, strong mouldings and films were prepared by compression moulding the dry polymer at 200° C., and the moulded samples were amorphous on X-ray examination. Differential Thermal Analysis of a moulded sample showed a Tg at 133° C., and a 1⁄8" (3.175 mm.) thick moulded plaque had a 1⁄10 Vicat softening point of 131° C. and a full Vicat softening point of 140° C.

EXAMPLE 17

9.932 parts of 4,4'-diaminodiphenyl sulphone and 2.000 parts of 4,4'-diaminodiphenylether were dissolved in 75 parts of pure, dry N,N-dimethylacetamide and treated with 11.25 parts of azelaoyl chloride under the conditions described in Example 7. 19.6 parts of polymer were produced having a reduced viscosity of 1.40 decilitres gm.$^{-1}$, measured as a 1 gm. decilitre$^{-1}$ solution in 98% sulphuric acid at 25° C.

Strong, transparent films and moulding were prepared by compression moulding the polymer at 230° C. Such mouldings were amorphous on X-ray examination, but crystallinity could be induced by immersing samples of film in acetone at 23° C. for from 4 to 10 hours, such samples producing an X-ray diffraction identical to that obtained from crystalline samples of the polymer of Example 3.

Differential Thermal Analysis of the amorphous compression/moulded film showed a Tg at 163° C. and a Tm at 203° C. and no crystallisation could be detected on cooling the melt from 250° C.

EXAMPLE 18

190 parts of 4,4'-diaminodiphenyl sulphone in solution in 1,320 parts of N,N-dimethylacetamide was treated with a mixture of 31.8 parts of sebacoyl chloride and 142 parts of azelaoyl chloride under the conditions of Example 1, the addition of the diacid chloride mixture being carried out over a period of 10 minutes.

On completion of the polymerisation, the mixture was diluted with 2,300 parts of N,N-dimethylformamide prior to isolation, purification, and drying. The process yielded 315 parts of a copolymer having a reduced viscosity, measured on a 1 gm./100 cc. solution in 98% sulphuric acid at 25° C., of 0.90 decilitre gm.$^{-1}$. 2" x 5⁄16" x 1⁄8" (50.8 x 7.94 x 3.175 mm.). Unnotched, compression moulded test pieces did not break in Charpy type impact tests carried out using a Hounsfield Plastics Impact Machine with a 2 lb. tupweight at 20° C. Notched (90° Sharp notched) samples of the same polymer examined on the same machine at the same temperature, but using a ⅛ lb. (56.7 gms.) tupweight had impact strengths of 23 kg. cm./cm.$^2$.

The dynamic modulus and loss-factor (tan δ) were measured as a function of temperature on samples which been compression moulded at 230° C. Using a vibrating cantilever apparatus, the temperature at which main chain motion became appreciable (i.e. $Tg$) was determined as 184° C. The dynamic modulus fell from $2.04\times10^5$ p.s.i. (14,340 kg./cm.$^2$) at 25° C. to $1.60\times10^5$ p.s.i. (11,250 kg./cm.$^2$) at 150° C., showing that a fair proportion of the room temperature strength properties of the polymer are retained to temperatures approaching the $Tg$.

A strip of amorphous compression moulded film was immersed in acetone at 23° C. for 48 hours. This treatment caused the polymer to become opaque and brittle and X-ray examination showed that the polymer was now poorly crystalline. Differential Thermal Analysis showed a melting point for the crystalline polymer of 206° C.

Similar treatment of amorphous polymer with 60/80 petroleum ether, benzene, toluene, methanol, chlorobenzene, water or methylene chloride failed to induce any crystallinity.

EXAMPLE 19

29.79 parts of 4,4'-diaminodiphenyl sulphone dissolved in 151 parts of N,N-dimethylacetamide were reacted with 28.71 parts of sebacoyl chloride under the conditions described in Example 1.

After isolation and purification, 48 parts of a polymer having a reduced viscosity measured on a 1 gm./100 cc. solution in 98% sulphuric acid at 25° C., of 1.15 docilitres gm.$^{-1}$ were obtained.

Transparent, strong, tough, 0.005" (0.127 mm.) thick films were prepared by compression moulding the powdered polymer at 230° C. at a pressure of 2,500 p.s.i. (176 kg./cm.$^2$). The films had a degree of toughness, as defined in Example 5, of 6 to 8, and when examined in tensile tests at room temperature, under a strain rate of 500% min.$^{-1}$, yielded the following results:

Yield stress—$9.65\times10^3$ p.s.i. (678.5 kg./cm.$^2$)
Average elongationd to break—22%

Further measurements at a strain rate of 100% min.$^{-1}$ yielded the following results:

Yield stress—$925\times10^3$ p.s.i. (650.3 kg./cm.$^2$)
Average elongation to break—50%

The polymer had a ⅒ Vicat softening point of 162° C., and a full Vicat softening point of 170° C. The density was measured as 1.253 gms./cc. The increase in weight of samples of the polymer by the uptake of water was measured as described in Example 2, and the following results were obtained:

| Conditions: | Increase in weight (percent) |
|---|---|
| 400 hrs. immersion in water at 20° C. | 1.92 |
| 400 hrs. exposure to the atomsphere at ambient temperatures | 0.65 |

X-ray examination of the powdered polymer and compression mouldings thereof showed them to be completely amorphous. Strips of film drawn 300% at 130° C. and then annealed under tension from 190° C. showed orientation, but no evidence of crystallinity.

EXAMPLE 20

4.91 parts of 3,3'-diaminodiphenyl sulphone, dissolved in 23 parts of pure, dry N,N-dimethylacetamide, were treated with 4.815 parts of sebacoyl chloride under the conditions described in Example 1. On completion of the polymerisation, the mixture was diluted with 80 parts of N,N-dimethylformamide prior to isolation, purification and drying. 4.0 parts of polymer were obtained having a reduced viscosity, measured on a 1 gm./100 cc. solution in 98% sulphuric acid at 25° C., of 0.62 decilitre gm.$^{-1}$.

Tough, transparent films having a degree of toughness, as defined in Example 5, of 6 to 8 could be prepared by compression moulding the powdered polymer at 230° C. under a pressure of 2,500 p.s.i. (176 kg./cm.$^2$). Both the moulded and powdered polymers were amorphous on X-ray examination.

EXAMPLE 21

9.932 parts of 4,4'-diaminodiphenyl sulphone and 2.000 parts of 4,4'-diaminodiphenyl ether were dissolved in 75 parts of pure, dry N,N-dimethylacetamide and treated with 11.95 parts of sebacoyl chloride under the conditions described in Example 7. After isolation, purification and drying 20.2 parts of polymer, having a reduced viscosity of 0.71 decilitre gm.$^{-1}$, measured on a 1 gm. decilitre$^{-1}$ solution in 98% sulphuric acid at 25° C. were obtained.

Strong, transparent films and mouldings could be prepared by compression moulding the polymer powder at 225° C. X-ray examination of the mouldings showed them to be amorphous, and annealing strips of film from 170° C. at 2° C./min. failed to induce any crystallinity.

Tensile tests carried out at a strain rate of 100%/min. at 21° C. on compression moulded samples of 0.005" (0.127 mm.) thick film gave the following results:

Yield stress—590 kg./cm.$^2$
Break stress—510 kg./cm.$^2$
Elongation to break—13%

Differential Thermal Analysis of a moulded sample showed a $Tg$ at 142° C., and a Vicat Softening Point determination showed a ⅒ Vicat Softening Point of 139° C. and a full Vicat Softening Point at 148° C.

EXAMPLE 22

6.68 parts of the diacid chloride of 1,10-decanedicarboxylic acid, and 5.98 parts of sebacoyl chloride were mixed together under anhydrous conditions. 12.43 parts of 4,4'-diaminodiphenyl sulphone were dissolved in 75 parts of N,N-dimethylacetamide and treated, following the procedure of Example 9, with the mixture of diacid chlorides. The dried, purified product, 20.6 parts, had a reduced viscosity of 0.87 decilitre gm.$^{-1}$ measured on a 1 gm. decilitre$^{-1}$ solution in 98% sulphuric acid at 25° C.

Strong, tough, transparent compression moulded films could be produced from the polymer at 220° C., such films having a degree of toughness as defined in Example 5, of 5 to 6.

Differential Thermal Analysis showed the polymer to have a $Tg$ at 150° C., and tensile tests carried out at a strain rate of 100%/min. at 20° C. on samples cut from 0.005" (0.127 mm.) thick compression moulded film gave the following results:

Yield stress—630 kg./cm.$^2$
Break stress—500 kg./cm.$^2$
Elongation to break—18%

A determination of the Vicat Softening Point showed a ⅒ Vicat Softening Point at 142° C. and a full Vicat Softening Point at 152° C.

EXAMPLE 23

24.83 parts of 4,4'-diaminodiphenyl sulphone were dissolved in 159 parts of dry N,N-dimethylacetamide, and the solution was stirred under an atmosphere of nitrogen and cooled to −12° C. 26.71 parts of the diacid chloride of 1,10-decanedicarboxylic acid were added to the diamine solution over a period of 1½ minutes, the reaction mixture being cooled to maintain the temperature below 4° C. When the addition of acid chloride was complete, the mixture was allowed to warm to 20° C. and was maintained at that temperature, with stirring, for a further 1 hour. After this time, the reaction mixture was diluted with 382 parts of N,N-dimethylformamide and the polymer was isolated by precipitation from 2,000 parts of rapidly stirred distilled water. After successive washings with hot water and hot methanol, followed by drying for 24 hours at 120° C. under a vacuum of 0.2 mm. Hg, 42 parts of product were obtained, having a reduced viscosity, measured on a 1 gm. decilitre$^{-1}$ solution in 98% sulphuric acid at 25° C., of 0.97 decilitre gm.$^{-1}$.

The dry polymer could be readily compression moulded at temperatures of 200° C. to 250° C. to give transparent, strong, tough mouldings and film. 0.005" (0.127 mm.) thick compression moulded film was found to have a degree of toughness, as defined in Example 5, greater than 10, and X-ray examination of the film showed it to have a very low degree of crystallinity which was not increased by drawing the film or by annealing it from 150° C. at 2° C./min.

Tensile tests carried out on dumbbell-shaped specimens die-cut from 0.005" (0.127 mm.) thick compression moulded film, gave the following results, at a strain rate of 100%/min. at room temperature:

Yield stress—715 kg./cm.$^2$
Break stress—620 kg./cm.$^2$
Elongation to break—23%

A 1/8" (3.175 mm.) thick compression moulded plaque was examined in a Vicat Softening Point test and was shown to have a 1/10 Vicat Softening Point of 150° C., and a full Vicat Softening Point of 163° C.

A 2" x 2" x 1/8" (50.8 x 50.8 x 3.175 mm.) compression moulded plaque was immersed in distilled water at 23° C. The increase in weight due to water uptake was measured for increasing periods of immersion, the results being recorded below:

| Immersion period (hrs.): | Percent increase in weight |
|---|---|
| 5 | 0.44 |
| 72 | 1.21 |
| 240 | 2.10 |
| 680 | 3.70 |

X-ray examination of a strip of compression moulded 0.005" film which had been treated with the vapour of boiling acetone for 2 hrs. showed that it was moderately crystalline. Differential Thermal Analysis of this crystalline polymer showed a T$g$ at 160° C. and a T$n$ at 183° C.

EXAMPLE 24

2.48 parts of 3,3'-diaminodiphenyl sulphone were dissolved in 15.9 parts of dry N,N-dimethylacetamide and the solution was stirred under nitrogen and cooled to −10° C. 2.67 parts of the diacid chloride of 1,10-decanedicarboxylic acid were added to the reaction mixture over a period of 30 seconds, the mixture being cooled to maintain the reaction temperature below 0° C. The temperature was then allowed to rise to 20° C. and maintained at that temperature with stirring, for a further 1 hour. The reaction mixture was then diluted with 47.6 parts of N,N-dimethylformamide and the polymeric product was precipitated from 1,000 parts of stirred, distilled water. The product was purified by washing with water and with methanol and was dried at 120° C. for 24 hours under a vacuum of 0.2 mm. Hg. 3.8 parts of polymer were obtained, having a reduced viscosity of 0.80 decilitre gm.$^{-1}$, measured on a 1 gm. decilitre$^{-1}$ solution in 98% sulphuric acid at 25° C.

The polymer could be readily compression moulded at 200 to 230° C. to give tough, strong, transparent films. Differential Thermal Analysis of a sample of moulded film showed a T$g$ at 107° C., and the polymer had a 1/10 Vicat Softening Point of 128° C. X-ray examination of the moulded film showed it to be amorphous, and annealing a sample from 170° C. failed to induce any crystallinity.

Tensile tests carried out at a strain rate of 100% min. at 21° C. on specimens die-cut from 0.005" (0.127 mm.) thick moulded film gave the following results:

Break stress—720 kg./cm.$^2$
Elongation to break—5.0%

EXAMPLE 25

4.96 parts of 4,4'-diaminodiphenyl sulphone were dissolved in 28.1 parts of pure, dry N,N-dimethylacetamide, the solution being stirred under an atmosphere of nitrogen and cooled to −20° C. 5.34 parts of the diacid chloride of 1,12-dodecanedicarboxylic acid were added in two portions over a period of 30 seconds. After stirring for 10 mins. at −20° C., the viscous reaction mixture was allowed to warm to room temperature and stirred for a further 2 hours. The reaction mixture was then diluted with 47.6 parts of N,N-dimethylformamide, and the polymer isolated by precipitation on pouring the reaction mixture into 500 parts of stirred, distilled water. The polymer was purified by washing in a high-speed mixer, with dilute (2%) ammonia solution and then with methanol.

On drying, 8.2 parts of polymer were obtained having a reduced viscosity, measured on a 1 gm./100 cc. solution in 98% sulphuric acid at 25° C., of 0.71 decilitre gm.$^{-1}$.

0.005" (0.127 mm.) thick, tough, transparent films could be prepared by compression moulding the dry, powdered polymer at 210° C. to 240° C. These films had a degree of toughness, as defined in Example 5, of 7–9.

What we claim is:

1. An amorphous polyamide having a reduced viscosity of at least 0.5 deciliter gram$^{-1}$, measured on a 1.0 gram deciliter$^{-1}$ solution in 98% sulfic acid at 25° C. the macromolecular chains of which consist essentially of repeating units having the structure

—HN—A—NHCO—B—CO— wherein A is a divalent radical selected from the group consisting of phenylene, oxydiphenylene, sulphonyl diphenylene and sulphonyl di(methyl substituted phenylene) and B is a divalent radical selected from the group consisting of phenylene and polymethylene containing at least 3 methylene groups, and in which at least 50% of said units have the structure

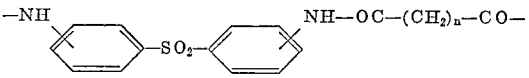

wherein each —NH—group is in the 2-, 3- or 4-position on the benzene ring and $n$ is a positive integer in excess of 3.

2. A polyamide as claimed in claim 1, the macromolecular chains of which consists essentially of repeating units selected from those having the structures.

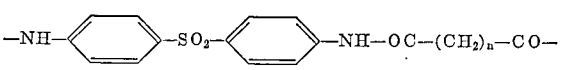

and

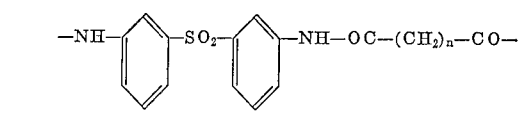

in which $n$ is a positive integer greater than 3.

3. A polyamide as claimed in claim 1 in which $n$ is 4, 5, 6, 7, 8, 10 or 12.

4. A polyamide as claimed in claim 1 in which the macromolecular chains consist essentially of repeating units having the structure

5. A polyamide as claimed in claim 1 in which the macromolecular chains consist essentially of repeating units having the structure

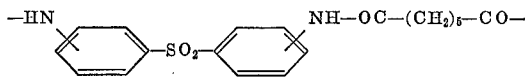

6. A polyamide as claimed in claim 1 in which the macromolecular chains consists essentially of repeating units having the structure

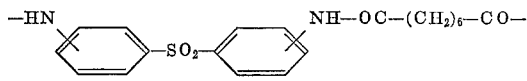

7. A polyamide as claimed in claim 1 in which the marcromolecular chains consist essentially of repeating units having the structure

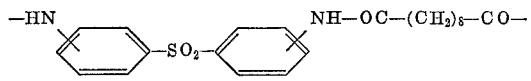

8. A polyamide as claimed in claim 1 in which the macromolecular chains consist essentially of repeating units having the structure

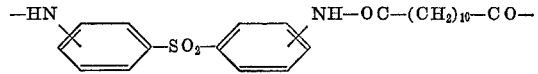

9. A polyamide as claimed in claim 1 in which the macromolecular chains consist essentially of repeating units having the structure

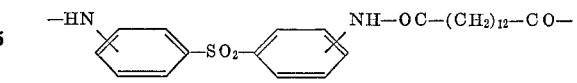

10. A polyamide as claimed in claim 1 having a reduced viscosity in the range 0.8 to 2.0 deciliter gram$^{-1}$.

11. A film or fiber of a polyamide as claimed in claim 1.

12. A polyamide as claimed in claim 1 in which the macromolecular chains consist essentially of repeating ugnits having the structure

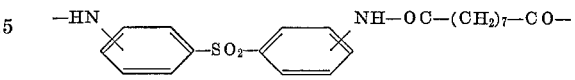

References Cited

UNITED STATES PATENTS 3,094,511    6/1963    Hill et al. _____ 260—78

HAROLD D. ANDERSON, Primary Examiner

U.S. Cl. X.R.

260—30.2 R, 30.6 R, 30.8 R, 32.6 N, 37 N, 47 Z, 78 S, 78 TF